United States Patent [19]

Cory

[11] 4,106,606
[45] Aug. 15, 1978

[54] VARIABLE SPEED DRIVE

[75] Inventor: Halsey W. Cory, Fairfield, Ohio

[73] Assignee: Force Control Industries, Inc., Hamilton, Ohio

[21] Appl. No.: 750,681

[22] Filed: Dec. 15, 1976

[51] Int. Cl.² .............................................. F16D 13/60
[52] U.S. Cl. ................................................ 192/113 B
[58] Field of Search ................................... 192/113 B

[56] References Cited
U.S. PATENT DOCUMENTS

| 3,366,211 | 1/1968 | May | 192/113 B |
| 3,791,498 | 2/1974 | Wassermann | 192/113 B X |

Primary Examiner—Samuel Scott
Assistant Examiner—Frank H. McKenzie, Jr.
Attorney, Agent, or Firm—Jacox & Meckstroth

[57] ABSTRACT

Power is transmitted from a motor to a pump or other device through a variable speed drive having a vertical input shaft disposed above a coaxial vertical output shaft. The shafts are rotatably supported by corresponding bearings retained within hub portions of a housing, and interfitting annular clutch plates and clutch discs are alternately connected to the input and output shafts. The clutch discs and plates are forced together by a fluid actuated piston, and the input shaft defines a passage for directing lubricating and cooling oil into the center of the clutch plates and discs so that the oil flows outwardly into an annular collecting chamber surrounding the clutch plates. The housing defines an annular oil reservoir chamber surrounding the oil collecting chamber, and heated oil is pumped from the collecting chamber through a heat exchanger and into the reservoir chamber. The top wall of the housing defines a horizontally extending passage through which oil is forced from the top of the reservoir chamber to the oil inlet passage within the input shaft.

15 Claims, 1 Drawing Figure

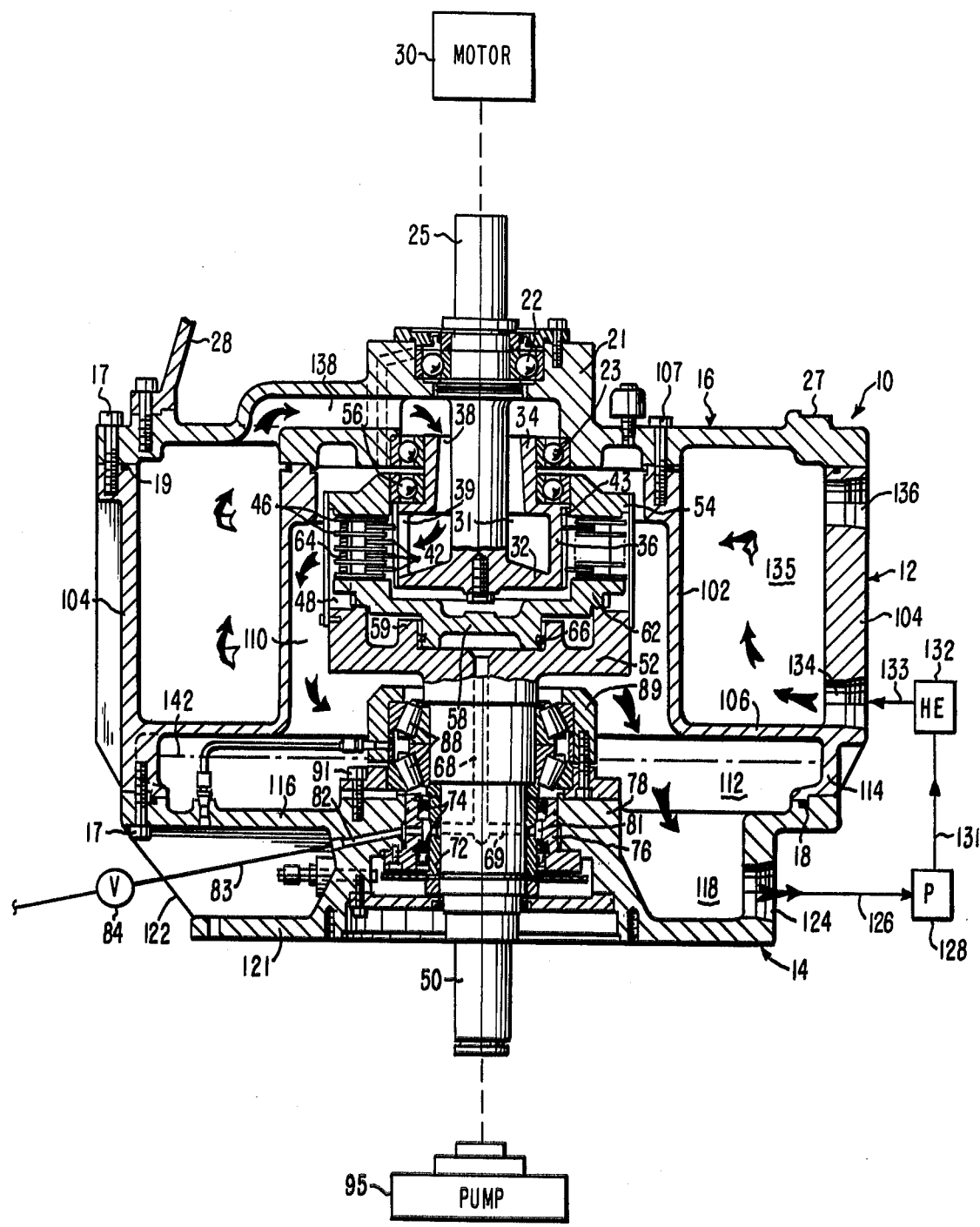

VARIABLE SPEED DRIVE

BACKGROUND OF THE INVENTION

The present invention relates to a variable speed drive of the oil shear type and which is particularly suited for transmitting torque at a variable speed from a prime mover such as an electric motor to a driven apparatus such as a pump, mixer, sewage aerator or the like. For such applications, it is common to mount an electric motor on top of a variable speed drive having a depending output shaft. The vertical shaft of the motor is coupled to the vertical input shaft of the variable speed drive, and the coaxial output shaft of the drive is coupled to the vertical shaft of the pump, mixer or other device to be driven. Preferably, a series of clutch discs are mounted on the input shaft and interfit with a series of clutch plates which are connected to rotate with the output shaft. A supply of oil is pumped or forced between the interfitting clutch discs and plates to maintain an oil film therebetween and to remove heat therefrom. The clutch discs and plates are clamped together by actuation of a piston which usually rotates with the output shaft.

One form of an oil shear variable speed drive which has been manufactured and sold by the assignee of the present invention, is disclosed in abandoned U.S. patent application Ser. No. 690,124, filed Dec. 13, 1967. This variable speed drive is constructed and installed so that the common axis of the input shaft and the output shaft is horizontal, and the oil which is forced or pumped between the clutch discs and plates is collected within the bottom of the housing which may incorporate a heat exchanger.

In a vertical type variable speed drive, the housing is constructed so that the oil flowing outwardly between the clutch disc and plates, is collected within a chamber defined within the lower end portion of the housing or within an external reservoir tank. It has been found highly desirable for the reservoir chamber to hold a substantial volume of oil, particularly with variable speed drives used for transmitting hundreds of horsepower, in order to provide for a high flow rate of oil outwardly between the clutch plates and discs. This high flow rate assures continuous lubrication of the plates and discs and also removes the substantial heat developed, especially when the output shaft is driven at a lower speed than the input shaft and relative slip occurs between the clutch plates and discs.

When the oil reservoir chamber is located within the lower portion of the housing of a vertical variable speed drive, the output shaft of the drive must be constructed with substantial length so that the clutch plates and discs are rotated at an elevation above the maximum level of the oil within the reservoir chamber. As a result, the housing for the variable speed drive must be constructed with a substantial vertical height, thereby elevating the location of the drive motor and increasing the overall stack height of the motor and variable speed drive assembly. This increase in length or vertical height of the output shaft also results in increasing the problem of vibration of the output shaft which must be precisely balanced to provide for long dependable service.

SUMMARY OF THE INVENTION

The present invention is directed to an improved variable speed drive of the oil shear type and which is particularly suited for installation with a vertical axis and for supporting an electric motor having a vertical shaft. As one important feature, the variable speed oil shear drive of the invention provides for a large oil reservoir chamber which is especially desirable with drives for transmitting a high horsepower. The drive also provides for minimizing the vertical height of the drive so that the vertical stack height of the assembled drive and motor is minimized. The variable speed drive of the invention also simplifies balancing of the rotating components of the drive and provides for an inherent vibration damper which extends the service life of the variable speed drive and motor assembly.

Other features and advantages of the invention will be apparent from the following description, the accompanying drawing and the appended claims.

BRIEF DESCRIPTION OF THE DRAWING

FIG. 1 is a vertical axial section through a variable speed drive constructed in accordance with the invention and diagrammatically illustrating the drive located between a drive motor and a driven pump.

DESCRIPTION OF THE PREFERRED EMBODIMENT

The variable speed drive unit shown in the drawing incorporates a cast metal housing 10 which includes an intermediate or center housing section 12 mounted on a base section 14 and enclosed by a cover section 16. The base section 14 is secured to the housing section 12 by a series of peripherally spaced screws 17 and is sealed by a resilient sealing ring 18. Similarly the cover section 16 is secured to the housing section 12 by a corresponding set of screws 17 and is sealed by a resilient sealing ring 19.

The cover section 16 includes an annular hub portion 21 which retains a set of axially spaced antifriction bearings 22 and 23 which rotatably support an input shaft 25. The cover section 16 also forms an annular seat 27 which supports the mating annular base 28 of a cast metal bracket constructed to support the base flange of a vertical electric motor 30. Preferably, the motor 30 is a constant speed induction or synchronous motor, and its vertical shaft is connected to the input shaft 25 by a suitable coupling (not shown). As mentioned above, the variable speed drive unit and drive motor may be of substantial size, for example, capable of producing and transmitting up to 3000 horsepower.

The input shaft 25 of the variable speed drive is provided with an internal oil chamber 31 formed by a radially extending flange portion 32 integrally connected to a cylindrical hub portion 34 by a plurality of peripherally spaced and axially extending lugs 36. The hub portion 34 cooperates with the concentric shaft 25 to define therebetween an annular inlet 38, and the lugs 36 define therebetween peripherally spaced outlets or openings 39.

A series of flat annular clutch discs 42 are connected to the input shaft 25 by an external spline 43 formed on the lug sections 36, and the spline 43 provides for axial floating movement of the clutch discs 42. A series of flat annular clutch plates 46 interfit between the clutch discs 42 in an alternating manner and have peripherally external spaced notches which receive corresponding axially extending lugs 48 cast as an integral part of an output shaft 50. Thus the clutch plates 46 rotate with the output shaft 50 but are free to float axially on the lugs 48. The lugs 48 form integral connections between a radial flange portion 52 and an annular thrust portion 54 of the output shaft 50. The thrust portion 54 is rotatably supported by an antifriction bearing 56 mounted on the hub portion 34 of the input shaft 25, and the hub portion 34 is also rotatably supported by the bearing 23.

A circular piston 58 is supported for axial movement within a cylinder 59 formed as part of the flange portion 52, and the piston 58 includes an annular outer thrust portion 62 which cooperates with the thrust portion 54 to confine the stack of interfitting annular clutch discs 42 and clutch plates 46 therebetween. A series of peripherally spaced compression springs 64 extend between adjacent clutch plates 46 and serve as separator springs between the clutch plates and to push the piston 58 toward its released position, as shown in FIG. 1.

A resilient sealing ring 66 forms a fluid-tight seal between the piston 58 and the cylinder 59, and hydraulic fluid is supplied to the bottom of the piston 58 through an axially extending passage 68 formed within the center of the outout shaft 50. The lower end of the passage 68 connects with a radially extending passage 69 which aligns with corresponding openings within a cylindrical sleeve 72 mounted on the output shaft 50. A pair of axially spaced ring seals 74 engage the outer surface of the sleeve 72 and are retained within an annular bushing 76 which extends into a cylindrical bore formed in annular hub portion 78 of the base housing section 14. The bushing 76 cooperates with the sleeve 72 to define an annular fluid chamber 81 between the ring seals 74, and hydraulic fluid is supplied to the chamber 81 and passages 68 and 69 through a pssage 82 which is connected by a hydraulic line 83 to a source of pressurized hydraulic fluid through a control valve 84. The pressure produced by the piston and 58 and the degree of relative slip between clutch plates and discs, is controlled by actuating the control valve 84. This actuation is usually performed automatically in response to a condition of the device driven by the output shaft 50.

As shown in the drawing, the output shaft 50 is rotatably supported by a set of antifriction bearings 88 which are preloaded within a two section annular bearing housing 89 secured to the hub portion 78 of the base housing section 14 by a set of screws 91. As illustrated in FIG. 1, the depending output shaft 50 is connected to drive the vertical input shaft of a pump 95. However, as mentioned above, the output shaft 50 may be connected to drive other forms of apparatus or devices, such as the impeller of a mixer or sewage aerator.

The cast metal housing 10 includes an annular or cylindrical inner wall 102 which is integrally connected to the annular or generally cylindrical outer wall 104 by a radially extending bottom wall 106. The inner wall 102 is also connected to the cover section 16 by a series of screws 107, and the inner wall 102 defines an oil collecting chamber 110 which surrounds the assembly of the input and output shafts. The collecting chamber 110 extends downwardly into an annular receiving chamber 112 defined between the bearing retaining hub 89 and a generally cylindrical wall 114 which forms a bottom extension of the outer wall 104 of the housing section 12. The base section 14 of the housing 10 includes a generally flat bottom wall 116 which has a portion defining a sump chamber 118 forming an extension of the annular chamber 112. The cast base section 14 also has a bottom support flange or base wall 121, and a series of peripherally spaced and radially extending ribs 122 integrally connect the wall 116 to the base wall 121 of the base section 14.

The sump chamber 118 has an outlet 124 which is connected by a line 126 to the inlet of an oil recirculating pump 128. The pump 128 may be driven by a close-coupled motor or it may be driven by the motor 30 through a belt drive connected to the input shaft 25. The outlet of the pump 128 is connected by a line 131 to the inlet of a heat exchanger 132 which has an outlet connected by a line 133 to an opening 134 within the outer wall 104 of the housing section 12.

An annular oil reservoir chamber 135 is defined by the walls 102, 104 and 106 of the intermediate housing section 12, and the reservoir chamber 135 is initially filled with oil through an opening 136 formed within the upper portion of the outer wall 104 and closed by a plug. The reservoir chamber 135 is connected to a radially extending passage 138 which is cast within the cover section 16 of the housing 10. The passage 138 extends from the reservoir chamber 135 into the hub portion 21 of the cover section 16 so that the oil flows from the reservoir chamber 135 into the annular oil inlet 38 for the chamber 31 within the input shaft 25.

As indicated above, the input shaft 25 is driven at the substantially constant speed of the motor 30, and the oil recirculating pump 128 is driven so that oil is forced through the heat exchanger 132 and into the reservoir chamber 135. The pump pressure forces the oil from the top of the reservoir chamber 135 inwardly through the passage 138 and into the inlet 38 of the impeller shaft chamber 31. The pressurized oil is forced through the outlets 39 and outwardly between the interfitting clutch discs 42 and clutch plates 46, and is collected within the chamber 110 where the oil drains into the chambers 112 and 118. The collected oil has a normal operating level 142 within the chamber 112, and this level is at all times below the rotating flange portion 52 of the output shaft 50. Preferably, the clutch discs and clutch plates are provided with circumferentially spaced and radially extending grooves within their opposite faces so that oil continues to flow between the plates and discs even after the piston 58 is fully extended and there is no relative slip between the clutch plates and discs so that the output shaft 50 is driven art the same speed as the input shaft 25.

From the drawing and the above description, it is apparent that a variable speed drive constructed in accordance with the present invention, provides desirable features and advantages. One important feature is provided by the construction of the housing 10 with the large reservoir chamber 135 located in concentric surrounding relation to the oil collecting chamber 110. This construction not only provides for a reservoir chamber capable of holding a substantial volume of oil, but also minimizes the vertical height of the variable speed drive, thereby minimizing the overall stack height of the combined motor and drive assembly. The shorter stack height aids in reducing vibrations associated with the assembly, and the mass of the oil within the annular reservoir chamber 135 further cooperates to dampen vibrations produced by the assembly of the rotating input and output shafts. The construction of the housing 10 further provides for simplified casting of the housing sections, thereby minimizing the cost of producing the housing.

While the form of variable speed drive herein described constitutes a preferred embodiment of the invention, it is to be understood that the invention is not limited to this precise form of drive, and that changes may be made therein without departing from the scope and spirit of the invention as defined in the appended claims.

The invention having thus been described, the following is claimed:

1. In a controllable variable speed drive including a housing, an input shaft supported within said housing for rotation, an output shaft supported within said housing for rotation generally coaxially with said input shaft, a series of annular clutch discs within said housing and mounted on said input shaft for rotation therewith, a series of annular clutch plates arranged in interfitting relation with said clutch discs, means for connecting said clutch plates to said output shaft for rotation therewith, means for applying an axial compressive force to said interfitting discs and plates for selectively coupling said input shaft to said output shaft, and said interfitting discs and plates defining spaces therebetween for receiving a flow of oil to maintain an oil film between adjacent discs and plates and to remove heat therefrom, the improvement wherein said housing comprises an inner wall surrounding said clutch discs and plates and defining a collecting chamber for receiving the oil flowing outwardly between said discs and plates, said housing further including an outer wall spaced radially outwardly from said inner wall and cooperating therewith to define a reservoir chamber therebetween, means for directing oil from said collecting chamber into said reservoir chamber, and means for directing a supply of oil from said reservoir chamber into said annular clutch discs carried by said input shaft.

2. A variable speed drive as defined in claim 1 wherein said input shaft includes means defining a rotatable chamber having an annular inlet surrounding said input shaft, and said housing includes a removable end wall defining an oil passage connecting said reservoir chamber to said inlet for said rotatable chamber.

3. A variable speed drive as defined in claim 1 wherein said inner and outer walls of said housing are annular and substantially concentric with the axis of said shafts to define an annular reservoir chamber therebetween.

4. A variable speed drive as defined in claim 1 wherein said housing includes opposite end walls, bearing means retained by said end walls and supporting said input shaft and said output shaft for independent rotation, a generally radially extending intermediate wall spaced between said end walls and integrally connecting said inner wall to said outer wall, and said intermediate wall forms an end wall for said reservoir chamber.

5. In a controllable variable speed drive including a housing, an input shaft supported within said housing for rotation on a substantially vertical axis, an output shaft supported within said housing below said input shaft for rotation on substantially said vertical axis, a series of annular clutch discs within said housing and mounted on said input shaft for rotation therewith, a series of annular clutch plates arranged in interfitting relation with said clutch discs, means for connecting said clutch plates to said output shaft for rotation therewith, means for applying an axial compressive force to said interfitting discs and plates for selectively coupling said input shaft to said output shaft, and said interfitting discs and plates defining spaces therebetween for receiving a flow of oil to maintain an oil film between adjacent discs and plates and to remove heat therefrom, the improvement wherein said housing comprises an inner wall surrounding said clutch discs and plates and defining an oil collecting chamber for receiving the oil flowing outwardly between said discs and plates, said housing further including an outer wall spaced radially outwardly from said inner wall and cooperating therewith to define an oil reservoir chamber therebetween, means for directing oil from the bottom of said collecting chamber into said reservoir chamber, and means for directing oil from the top of said reservoir chamber into said annular clutch discs carried by said input shaft.

6. A variable speed drive as defined in claim 5 wherein said input shaft includes means defining a rotatable chamber having an annular top inlet, said housing includes a removable top cover member, and said cover member includes means defining an oil passage connecting the top of said reservoir chamber to said inlet of said rotatable chamber.

7. A variable speed drive as defined in claim 5 wherein said inner and outer walls of said housing are each generally cylindrical and substantially concentric with said vertical axis to define an annular said reservoir chamber therebetween.

8. A variable speed drive as defined in claim 5 wherein said inner wall of said housing is integrally connected to said outer wall of said housing by a radially extending wall forming the bottom wall for said reservoir chamber.

9. A variable speed drive as defined in claim 5 wherein said housing includes a bottom wall having an annular hub portion, bearing means mounted on said hub portion and rotatably supporting said output shaft, said bottom wall includes means defining a sump chamber forming a downward extension of said collection chamber, and means for removing collected oil from said sump chamber.

10. A variable speed drive as defined in claim 9 wherein said outer wall of said housing includes means defining an inlet for said reservoir chamber, and means for pumping oil from said sump chamber to said inlet of said reservoir chamber.

11. A variable speed drive as defined in claim 5 wherein said housing includes an intermediate section disposed between a base section and a cover section, said intermediate section includes said inner and outer walls, and a bottom wall connecting said inner and outer walls and forming the bottom of said reservoir chamber.

12. A variable speed drive as defined in claim 11 wherein said outer wall of said intermediate section of said housing projects downwardly from said bottom wall and cooperates with said base section to define an annular oil receiving chamber disposed below said oil collecting chamber.

13. A variable speed drive as defined in claim 12 wherein said base section defines an oil sump chamber disposed below said oil receiving chamber.

14. In a controllable variable speed drive including a housing, an input shaft supported within said housing for rotation on a substantially vertical axis, an output shaft supported within said housing below said input shaft for rotation on substantially said vertical axis, a series of annular clutch discs within said housing and mounted on said input shaft for rotation therewith, a series of annular clutch plates arranged in interfitting relation with said clutch discs, means for connecting said clutch plates to said output shaft for rotation therewith, means for applying an axial compressive force to said interfitting discs and plates for selectively coupling said input shaft to said output shaft, and said interfitting discs and plates defining spaces therebetween for receiving a flow of oil to maintain an oil film between adjacent discs and plates and to remove heat therefrom, the improvement wherein said housing comprises an intermediate section disposed between a base support section and a top cover section, said intermediate section includes an inner wall surrounding said clutch discs and plates and defining an oil collecting chamber for receiving the oil flowing outwardly between said discs and plates, said intermediate housing section further including an outer wall spaced radially outwardly from said inner wall and integrally connected to said inner wall by a generally horizontal bottom wall, said inner and outer walls cooperating with said bottom wall to define an oil reservoir chamber within said intermediate section, means for directing oil from the bottom of said collecting chamber into said reservoir chamber, and means within said cover section for defining a passage to direct oil from the top of said reservoir chamber into said annular clutch discs carried by said input shaft.

15. A variable speed drive as defined in claim 14 wherein said inner and outer walls of said intermediate housing section are each generally cylindrical and substantially concentric with said vertical axis to define an annular said reservoir chamber therebetween.

* * * * *